United States Patent [19]
Mitchell et al.

[11] Patent Number: 5,761,757
[45] Date of Patent: Jun. 9, 1998

[54] PASSENGER BOARDING BRIDGE FOR SERVICING COMMUTER AIRCRAFT

[75] Inventors: Gary Ronald Mitchell, Salt Lake City; Daniel Dean Pohly, Huntsville; Eric Peter Beazer, Ogden; Bruce Wayne Anderson, Hooper, all of Utah

[73] Assignee: FMC Corporation, Chicago, Ill.

[21] Appl. No.: 742,542

[22] Filed: Nov. 1, 1996

[51] Int. Cl.[6] .................................................. E01D 1/00
[52] U.S. Cl. .............................. 14/71.5; 14/69.5; 14/71.1
[58] Field of Search ................................ 14/69.5, 71.1, 14/71.3, 71.5, 72.5

[56] References Cited

U.S. PATENT DOCUMENTS 3,843,987  10/1974  Lodjic .......................................... 14/71
4,369,538  1/1983   Smedal ....................................... 14/69.5
4,602,697  7/1986   Aanensen .................................... 182/48
5,524,318  6/1996   Thomas ....................................... 14/72.5

OTHER PUBLICATIONS

Wollard Aircraft Service Equipment, Inc., "Passenger Speedway," 1965.
Brochure: "Jetway Passenger Boarding Bridges" (6 pages) General disclosure of bridge and cab.
Flyer: "Apron Drive Passenger Boarding Bridge" (2 pages) © 1995 Specifications and photo of bridge and cab.

Primary Examiner—Tamara L. Graysay
Assistant Examiner—Gary S. Hartmann
Attorney, Agent, or Firm—Ronald C. Kamp

[57] ABSTRACT

A passenger boarding bridge for providing a passageway from an aircraft to a passenger terminal includes a cab section with a floor. The floor of the bridge is provided with a cutout portion that can accommodate the stair components of commuter aircraft that are being served by the passenger boarding bridge.

4 Claims, 8 Drawing Sheets

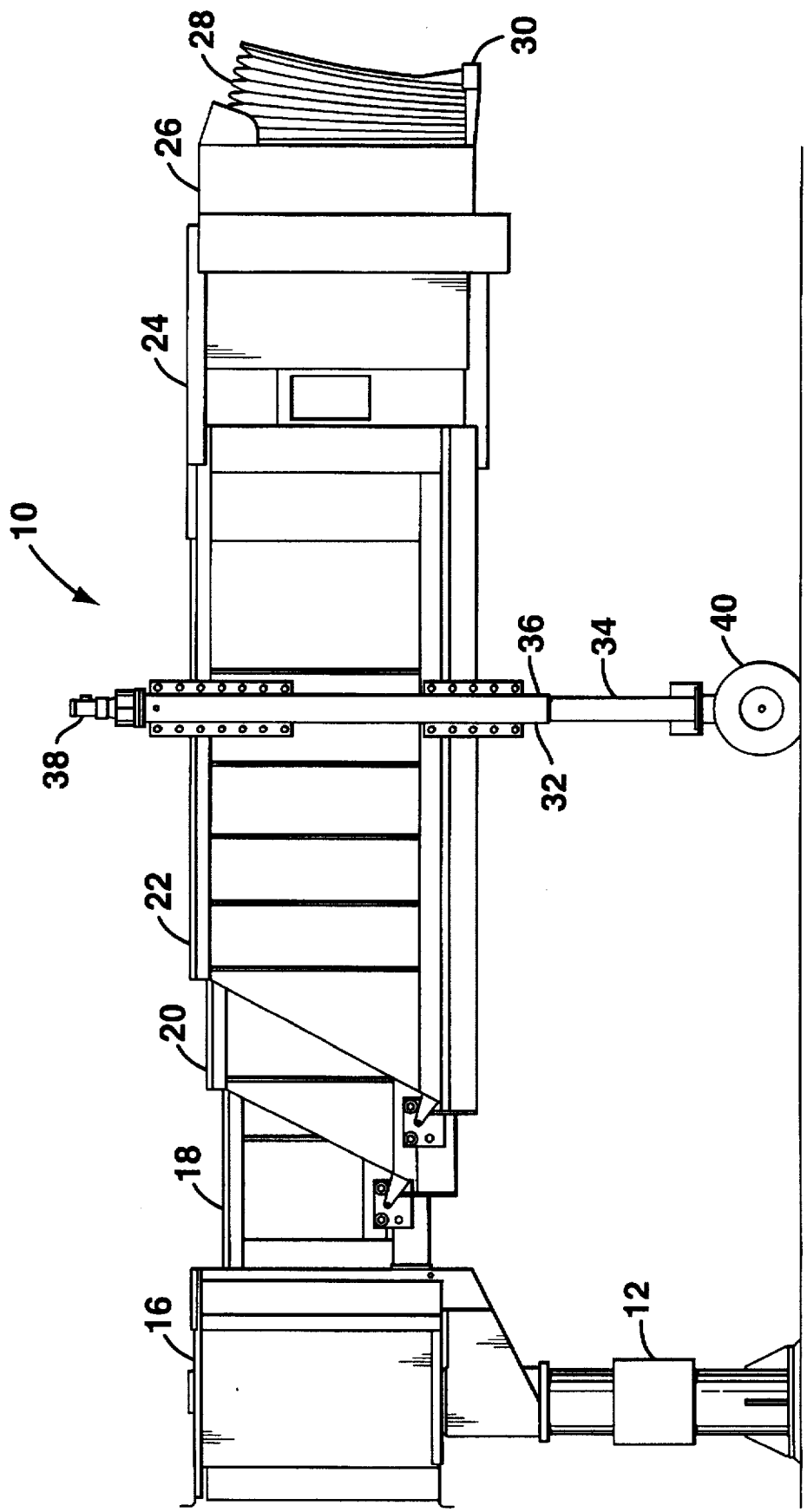
FIG_1

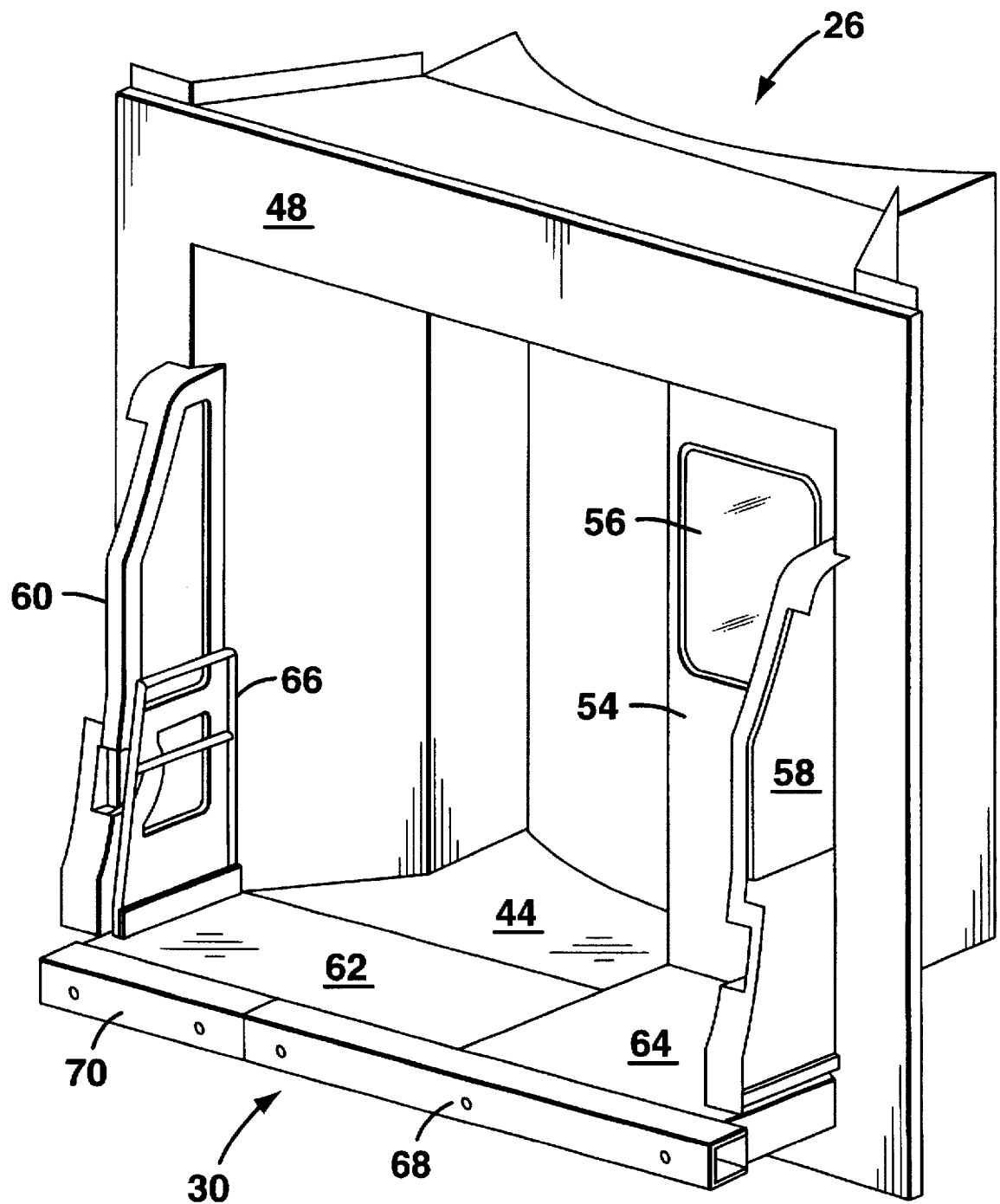
FIG_2

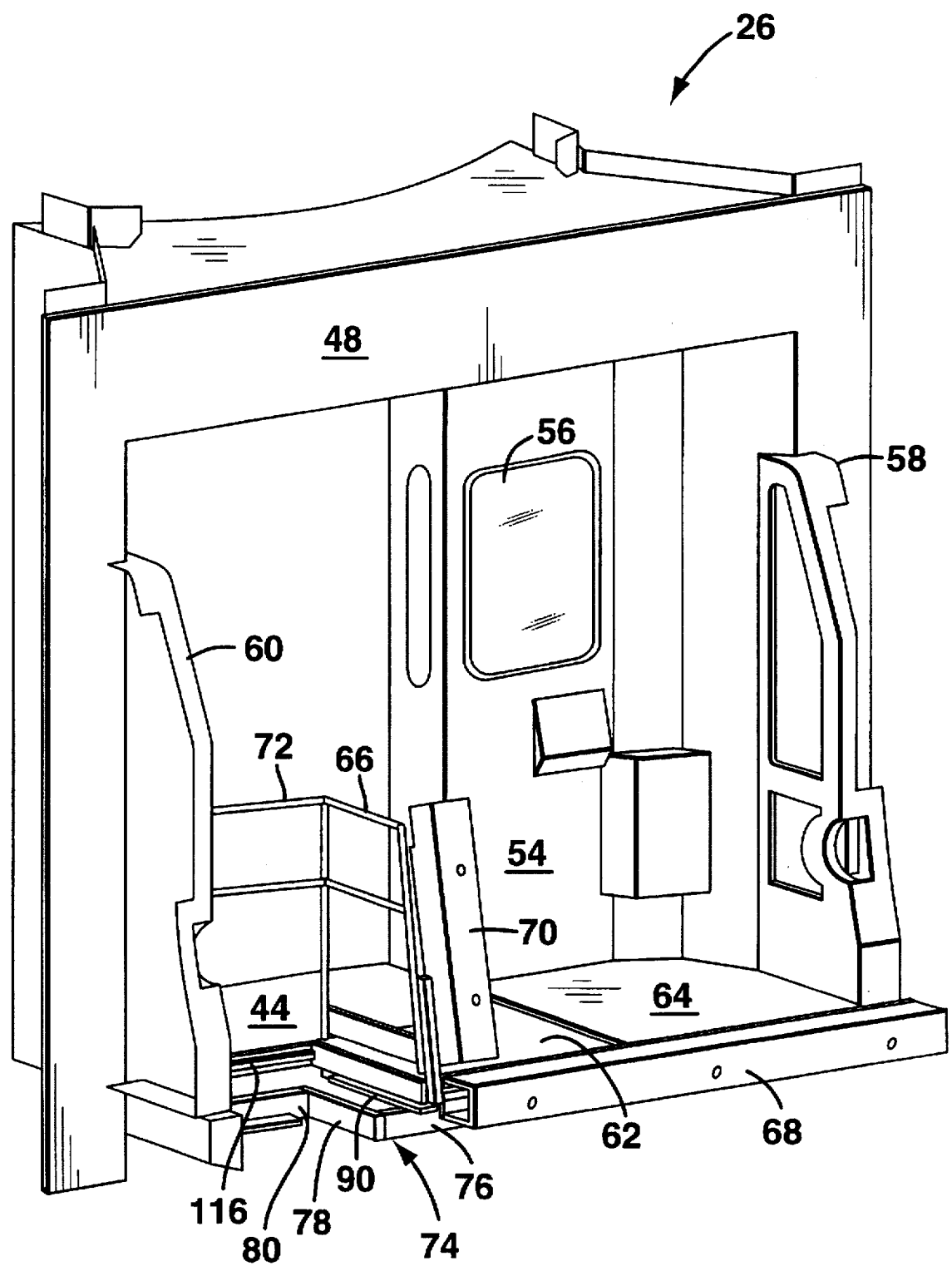
FIG_3

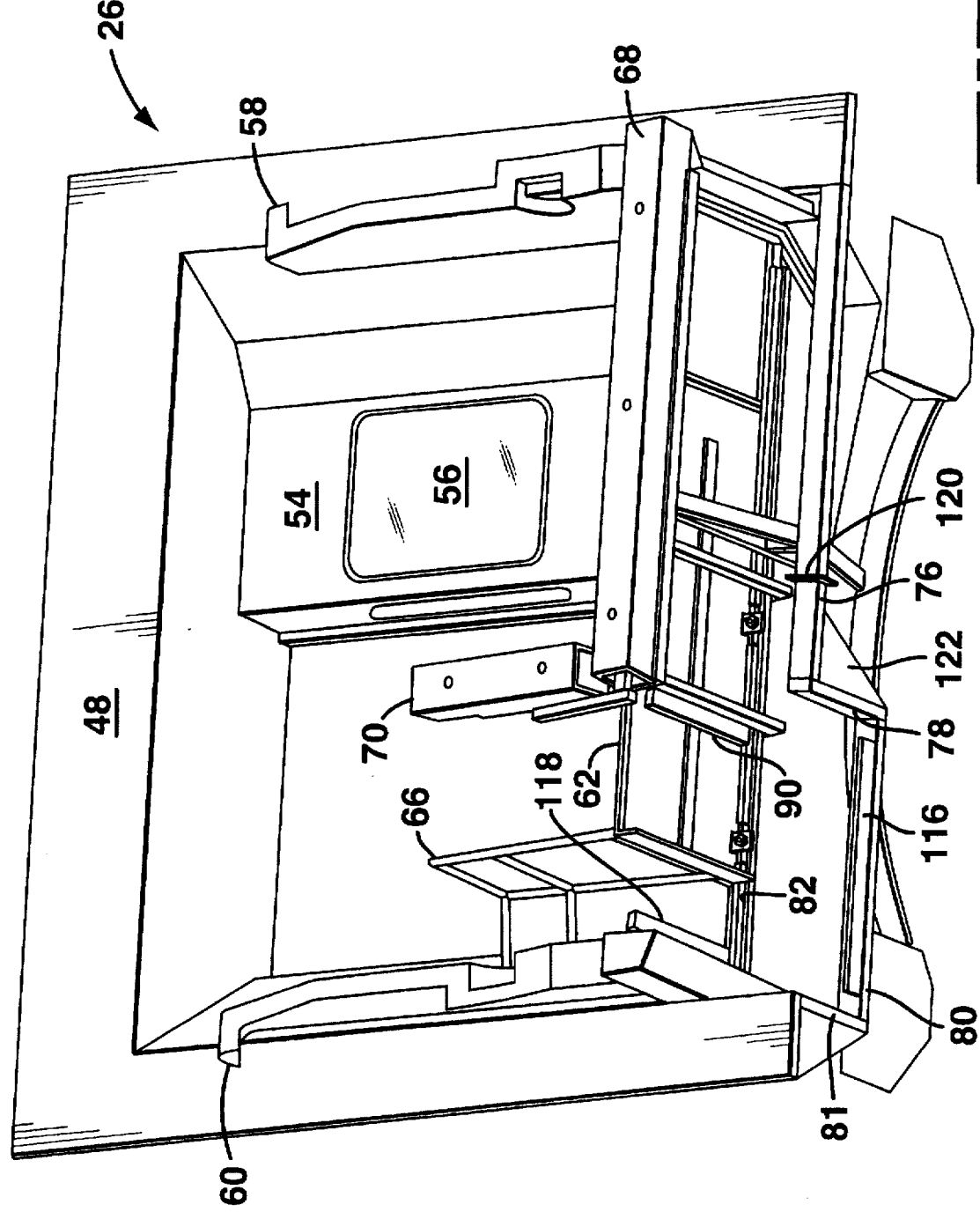

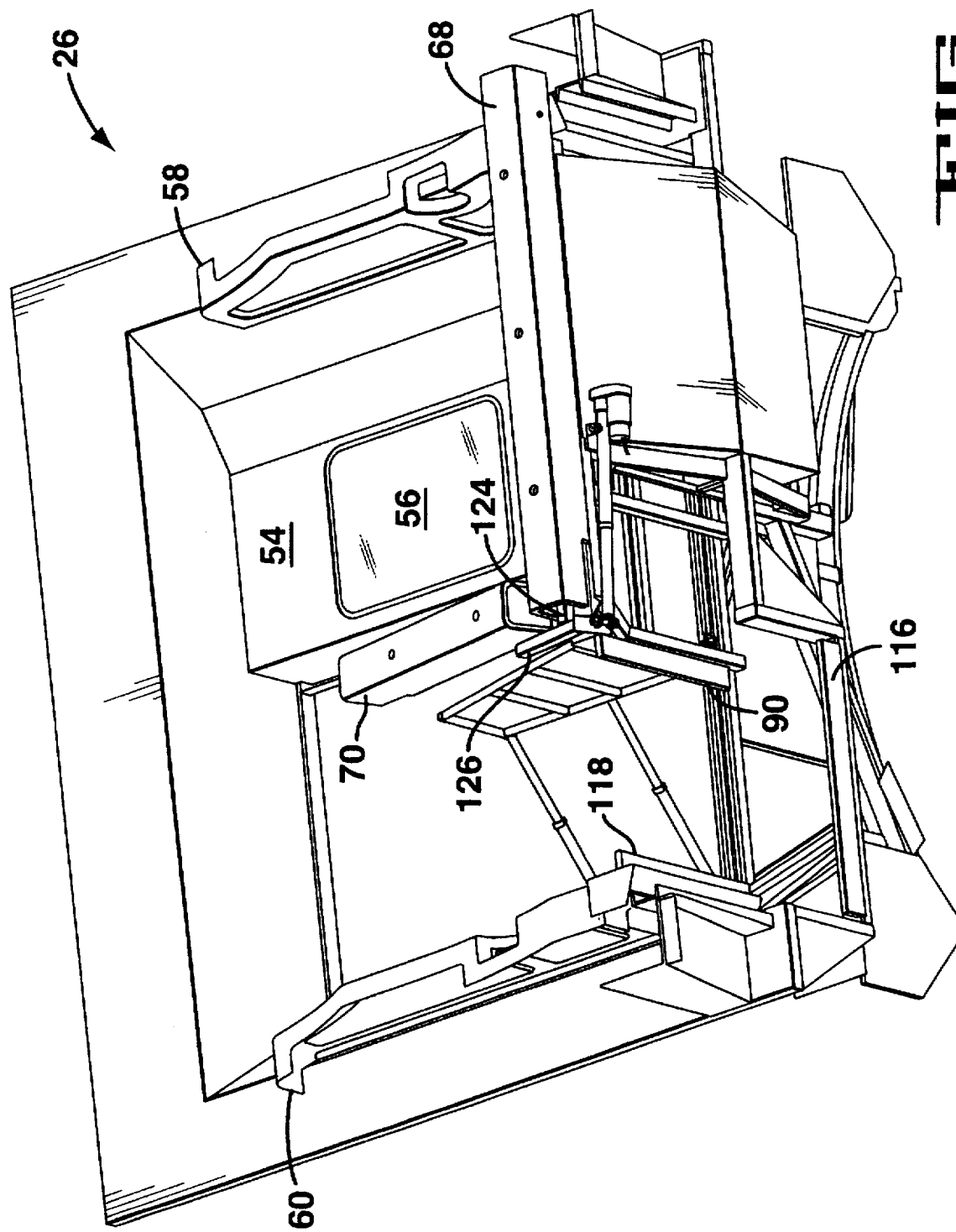

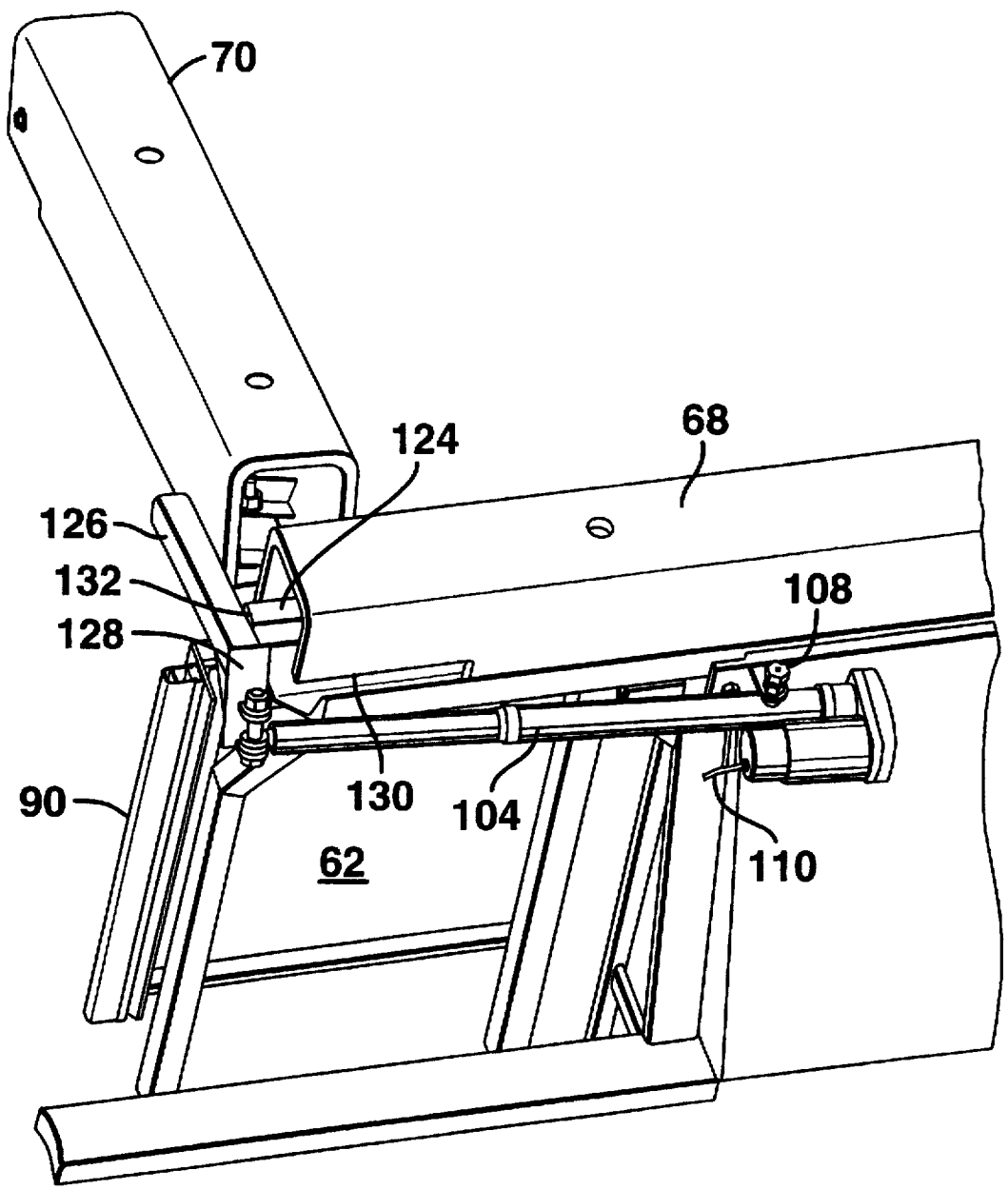
FIG_6

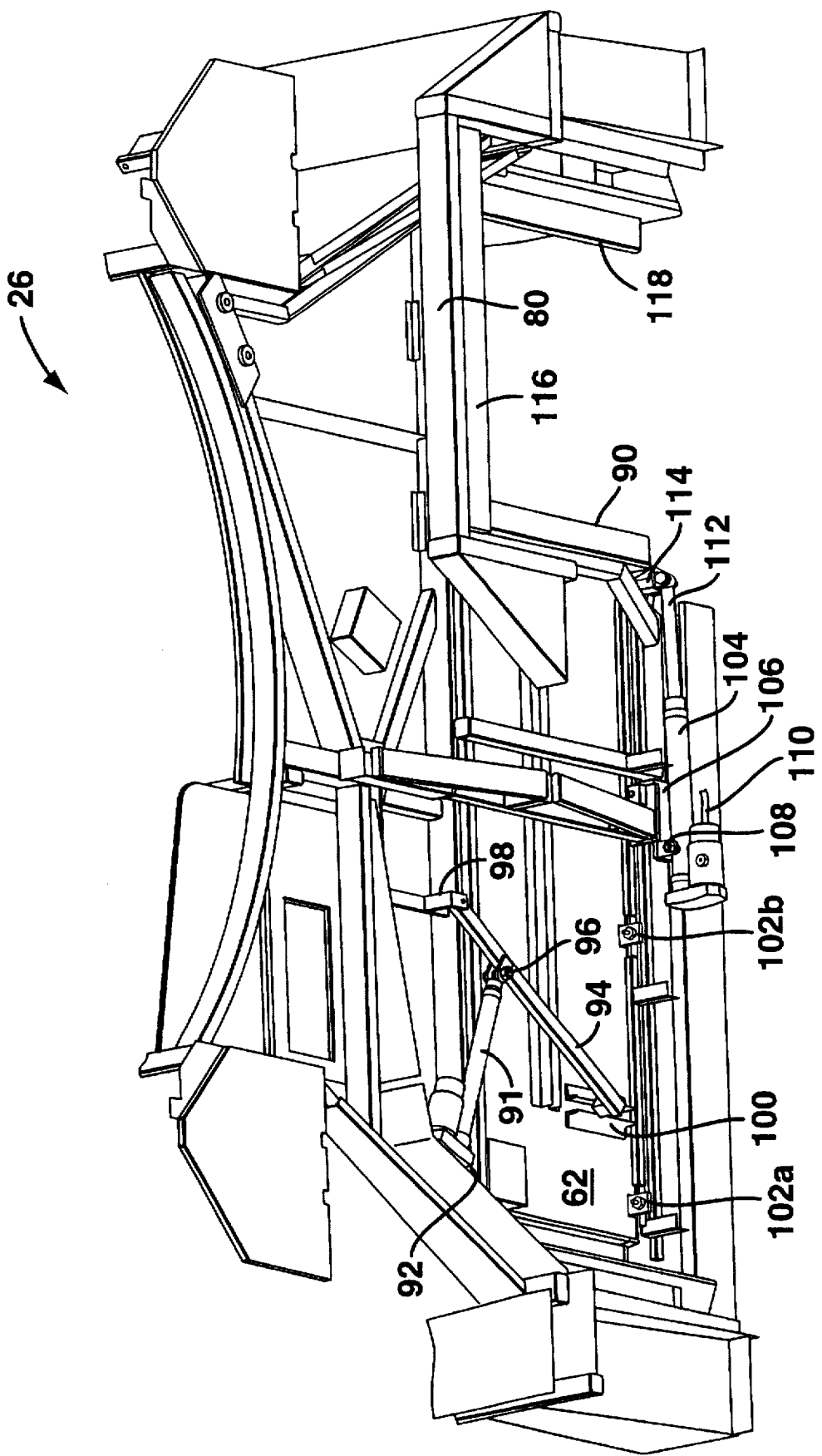
FIG_7

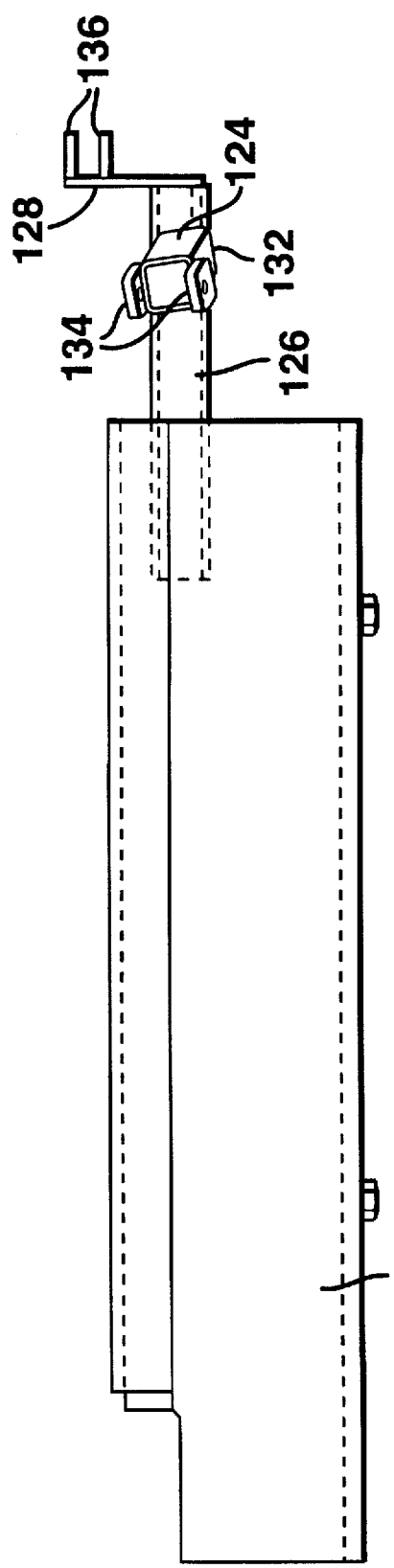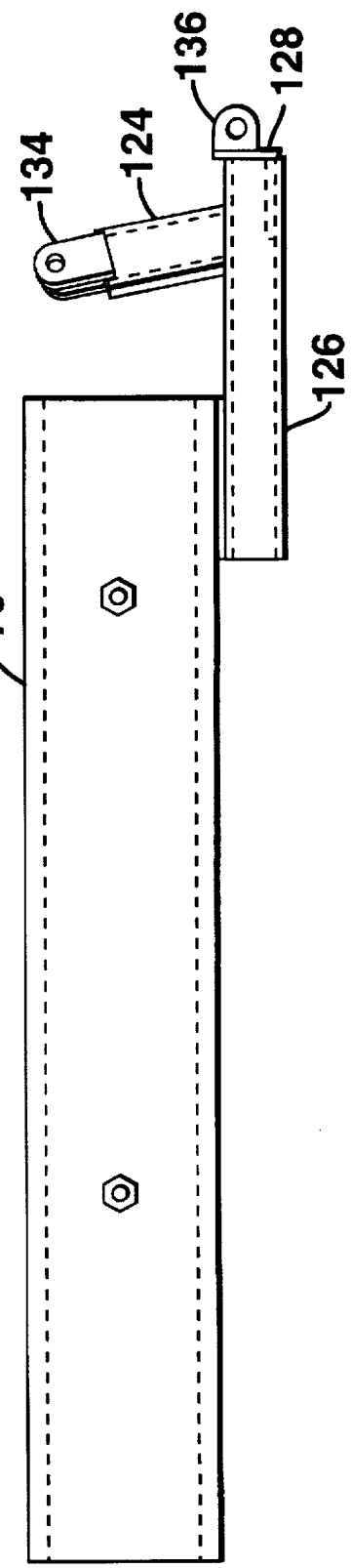

5,761,757

PASSENGER BOARDING BRIDGE FOR SERVICING COMMUTER AIRCRAFT

BACKGROUND OF THE INVENTION

1. Field of the Invention

This invention has to do with passenger boarding bridges of the type used in airport facilities to provide passenger access to parked aircraft without exposing the passengers to the weather and ambient conditions between the parked aircraft and the terminal.

More specifically the standard passenger boarding bridge is modified to provide a cabin structure that will interface with the small commuter aircraft now popularly being flown into regional airports.

2. Description of the Background Art

The closest prior art to this invention is the conventional passenger boarding bridge made by FMC Corporation under the trademark "Jetway," by the Jetway Systems operation of FMC in Ogden, Utah. These bridges are freestanding passenger boarding bridges that are attached or adjacent to the airline terminal at a fixed but horizontally rotatable end and will be driven into position at the outboard end of the passenger boarding bridge to interface with a parked aircraft. The aircraft usually accommodated with these bridges are jet aircraft ranging in size from small one hundred passenger aircraft to large intercontinental passenger aircraft.

The bridges in common use at airports today have a bubble portion at the outboard aircraft servicing end that has a small cab portion projecting therefrom. The cab contains the operator's station of the passenger boarding bridge. The cab portion will have a floor that is generally continuous in its width. It may be intermediately hinged to provide some horizontal adjustment when the cab is rotated at a high angle relative to the apron or ground.

In many of today's passenger boarding bridges the leading edge of the cab portion at the floor level is provided with a significant bumper that will be positioned close to the aircraft being serviced. It will either contact the aircraft or will be so close to the aircraft that it will close the gap between the aircraft and the bridge.

SUMMARY OF THE INVENTION

The invention is defined by the appended claims with the specific embodiment shown in the attached drawings. For purposes of summarizing the invention, the invention may be first be thought of as a version of a passenger boarding bridge that has been specially designed or modified to allow its use with commuter aircraft or smaller aircraft that stow their own stair systems in the aircraft.

The invention includes either modifying existing passenger boarding bridges or constructing new passenger boarding bridges that have a sliding floor and a bumper that can be repositioned to an alternative position.

It has been found that there is a need to service small and commuter aircraft with a passenger boarding bridge that will provide the same level of protection from the elements as provided passengers traveling on board large aircraft. Passengers are accustomed to entering and exiting aircraft through passenger boarding bridges and have come to rely on the shelter from the elements that the bridges provide. Airlines strive to offer service that meets the needs and the expectations of its passengers. A covered bridge protected entry is somewhat more comfortable in certain weather conditions such as heat, cold, rain, and snow. Furthermore, the passenger boarding bridge approach minimizes the number of persons on the "ramp" or paved area surrounding a parked aircraft. This gives aircraft service crews more room to operate.

One other advantage of providing aircraft access by bridge is that passengers can be loaded and unloaded a bit more quickly as compared to the time it takes when passengers are required to climb stairs to the aircraft. The stairs may also present an impediment to persons with less alacrity.

The commuter aircraft that can be served by the modified bridge presented herein usually have a foldout stairway at the passenger door. The staircase travels with the aircraft and is deployed upon landing to provide passenger access. The stairset will often also include a handrail. This handrail will deploy when the stairs are deployed. This provides a problem for the use of a passenger boarding bridge in that the staircase handrail will extend several feet away from the fuselage of the aircraft and will block the bumper of the cab of the passenger boarding bridge from being driven right up next to the fuselage of the aircraft as is possible with large aircraft not equipped with the foldout stairs and handrail.

The instant invention resolves this dilemma by providing a passenger boarding bridge in which the bumper is removed or in a more preferred embodiment is displaced or deployed to a second location from its normal location at the leading edge of the cab floor. A portion of the cab floor is moved out of the way so that the stairset associated handrail of the aircraft can be accommodated in a slot in the floor within the cab of the passenger boarding bridge.

The bumper bar of a cab of a conventional passenger boarding bridge is a continuous length of padding at the leading edge of the floor of the cab. In the instant invention the bumper bar is stowed in a first fixed position and is movable into a displaced second position. The second position allows the cab of the bridge to be driven up close to and even in contact with the aircraft, contact being between the fixed portion of the bumper bar and the aircraft skin.

One aspect of the invention is to provide a passenger boarding bridge that has the capability of servicing not only large aircraft but also smaller aircraft or aircraft having an obstruction that prevents the cab of a passenger boarding bridge from being driven up close enough to the aircraft to allow passenger loading and unloading.

Another advantage of this invention is to provide a passenger boarding bridge that can accommodate an obstruction on an aircraft with some leeway or lack of precision when positioning the cab of the bridge at the aircraft.

Also an object of the invention is to provide a movable floor section in the passenger boarding bridge cab that can be used to maximize the passage width of the cab when servicing either larger or small aircraft.

The foregoing has outlined some of the more pertinent objects of the invention. These objects should be construed to be merely illustrative of some of the more prominent features and their application to the intended invention. Many other beneficial results can be attained by applying the disclosed invention in a different manner or by modifying the invention within the scope of this disclosure. Accordingly, recognition of other objects and a fuller understanding of the invention may be had by referring to the summery of the invention and the detailed description of the preferred embodiment in addition to the scope of the invention defined by the claims taken in conjunction with the accompanying drawings.

BRIEF DESCRIPTION OF THE DRAWINGS

These and other attributes of the present invention, and many of the attendant advantages thereof, will become more

3 readily apparent from a perusal of the following description and the accompanying drawings, wherein:

FIG. 1 is a side elevation view of a passenger boarding bridge;

FIG. 2 is an orthographic projection of the cab portion of a passenger boarding bridge showing the floor portion and bumper in a first position;

FIG. 3 is an orthographic projection of the cab portion of the invention showing the floor portion and the bumper in a second position;

FIG. 4 is an incomplete structural view of the structure shown in FIG. 3 from below the cab with some lower floor plates removed to show the frame and sliding floor of the cab;

FIG. 5 is similar to FIG. 4 showing mechanism for rotating a portion of the bumper bar to the second position;

FIG. 6 is a portion of the structure shown in FIGS. 1-5 showing the apparatus for deploying the bumper portion to the second position;

FIG. 7 is a view of the underside of the cab structure with structural elements shown as necessary and portions of the structures removed for clarity;

FIG. 8 is a pictorial representation of the structure for deploying the moveable bumper portion;

FIG. 9 is a rotated view of the structure shown in FIG. 8.

DETAILED DESCRIPTION OF THE PREFERRED EMBODIMENT

The major components of a passenger boarding bridge are shown in FIG. 1 where the passenger boarding bridge, generally 10, is shown in a retracted and elevated position. The bridge is supported on column 12 at the inboard end of the bridge which is the end of the bridge proximate to the passenger terminal. The support column 12 pivotally supports an entry vestibule and the rotunda 16.

The first tunnel section 18 is connected to the rotunda and is free to pivot vertically and allows the tunnel sections 20 and 22 to be elevated or lowered to align with the aircraft passenger access door.

The intermediate tunnel 20 is telescopically carried relative to the first tunnel section 18. The third or outermost tunnel section 22 is likewise telescopically carried relative to the intermediate tunnel section. The tunnel sections shown in this FIG. 1 are relatively short in order to fit the illustration on the page. Tunnel sections are generally longer than those shown in this figure.

At the end of the outermost tunnel 22 a bubble section 24 is carried. The bubble section 24 includes a cab 26 which serves as a portal to the aircraft. The cab section is rotatable on the bubble section to allow appropriate positioning with the aircraft. A weather shielding bellows 28 is one of the outermost components of the passenger boarding bridge. The steel frame supported bellows 28 is supported above a floor section that includes a bumper portion 30. The cab section 26 is the area of the passenger boarding bridge that has been improved by the inventors of the instant invention as will be discussed further on in this specification.

An elevating structure 32, including sets of telescopically associated members 34 and 36, provides the elevation adjustment of the passenger boarding bridge. A motor 38 drives a ball screw actuator to provide the adjustment of the telescoping tubes. Each side of the bridge is equipped with the elevating structure, one side of which is shown in FIG. 1.

4

A pair of support wheels, one shown as 40, is mounted to the elevating structure. These wheels are typically driven by an electric motor and will allow the bridge to be driven up to the airplane to be serviced. Up to this point the structure shown is typical of the structures well known in the art with the exception of the cab area 26.

The invention resides in the cab of the passenger boarding bridge. The cab, generally 26 in FIGS. 2, 4, and 5, is specially constructed to accommodate large commercial aircraft as well as small commuter aircraft. The smaller aircraft normally have a stairway integral with the aircraft so that passengers may embark and disembark on the airport apron in smaller regional airports where passenger boarding bridges don't exist. However, these same small commuter aircraft often fly into major city airports where passenger boarding bridges are popular. Thus, being able to use the existing passenger boarding bridges at major airports or the use of dedicated passenger boarding bridges at smaller airports that can accommodate both large and small aircraft is desirable.

In the drawing figures the cab 26 is mounted to the bubble and can be moved horizontally around the bubble for a limited distance. The floor of the bubble and the floor of the cab 44 are generally at the same level.

The passenger boarding bridge operator's station is behind partition 54 that includes the viewing port or window 56. The operator's station is the control center for the bridge and has numerous electrical connections and switching gear which enables, in a conventionally, well known manner, the driving and operation of the bridge.

Left 58 and right 60 side (viewed from the operator's station) barriers extend from the portal panel 48. A movable, that is slidable floor 62, can be slid laterally into a space under a raised floor 64 exposing an opening under the slidable floor 62. A handrail and movable barricade 66 is attached to the sliding floor 62 and will move with the sliding floor as it is slid under and out from under the raised floor portion 64. This will be discussed further on in the specification.

The foremost or leading element of the cab is the bumper generally 30. The bumper will be positioned right up to and sometimes against or in contact with the aircraft being serviced. In this embodiment the bumper is comprised of two main pieces, a stationary piece 68 and a movable, hinged piece 70. Both pieces are constructed of an elastomeric material formed in a channel section shape having a follow interior as will be explained further on.

The hinged portion 70 of the bumper 30 is hinged to rotate upwardly and slightly inboard as best seen in FIG. 3.

In FIG. 3 the slidable floor 62 is shown slid to the operator's left approximately as far as it has been designed to slide since it must slide into the area under the raised floor 64 portion of the cab. The handrail 66 shows in this view that there is a handrail or barricade extension 72 extending from the upstanding handrail 66 to the right side barrier 60. The two part handrail extension 72 may be an assembly of telescoping elements, chain type elements, or jointed and articulated bars that are collapsible such that as the sliding floor 62 moves to expose an open area, the handrail extension 72 will block inadvertent personnel access to the opening in the floor resulting from the sliding floor 62 being slid to the operator's left.

In FIG. 3 a subframe 74 can be seen. This subframe includes a first horizontal frame piece 76, a set back member 78, and a second horizontal member 80. The second horizontal member 80 is fixedly attached at one end to a first outboard frame member 81 (FIG. 4) and to its other end to the setback member 78.

A track system 82 is provided to support and guide the slidable floor 62. In a preferred embodiment a plurality of cam rollers will run on a track such as is partially shown as 82. A second set of cam rollers could be positioned below the support track for the cam rollers to assist in alignment and retention of the sliding floor on the track. Although cam rollers on a track are a preferred embodiment many well known slider designs are available and can be used interchangeably for the sliding mechanism to support the sliding floor 62.

It should be pointed out that the drawing figures herein are as complete as needed to show the invention but do not include, in each view, the totality of the structural elements. The majority of the elements not shown in great detail or in their entirety are structural parts that are used on conventional passenger boarding bridges.

Turning to FIGS. 4, 5, and 6 the sliding floor and pivoting bumper element will be explained.

The sliding floor will be positioned by means of a linear actuator (FIG. 7) attached to a mounting location on the bottom of the sliding floor 62 and mounted or grounded to the cab frame at the other end of the actuator. Hydraulic or electric actuators could be used to slide the floor and manual floor sliding is also contemplated not only as an override solution to an automatic actuator controlled by the bridge operator but also to provide for a less expensive structure.

In FIG. 7, the linear actuator 91 pivotally mounted to support element 92 at one end and to a crank arm 94 at a clevis 96. The crank arm 94 is pivotally mounted at 98 to a fixed receiver. The second end of the crank arm 94 is slidably restrained in slot means 100, in this embodiment a slot formed by two angle pieces fixed to the bottom of the floor. As the linear actuator 91 is extended the crank will drive the floor to the right in this figure to cover the gap or void which was created when the floor was slid to the retracted position as shown in FIG. 7.

The floor is supported by means of cam rollers, two of six cam rollers shown as 102a and 102b in FIG. 7 although any reasonable number of cam roller can be used to support the floor 62.

To open the gap for servicing commuter aircraft with stairs the linear actuator 91 will be retracted thus drawing the crank arm 94 toward it and moving the floor to open the gap.

In this embodiment it has been determined that linear actuators are the preferred actuators for moving the floor 62 and for pivoting the bumper bar. The linear actuators will be wired to a source of power or current and will include a control circuit that communicates with the operator's control station in the cab for linear actuator actuation.

A second linear actuator, that being the bumper actuator 104, is mounted to a frame member 106 through a gimbal mount 108. This actuator depiction shows a portion of the electrical power supply and control conduit 110 that will continue to the control panel of the bridge to give the bridge operator the means to actuate the bumper actuator 104 to raise or lower the pivotable bumper portion. In this view the linear actuator is shown in the extended position with rod 112 pivotally connected to a support 114 of the pivoting bumper.

In this FIG. 7 view of the underside of the cab generally 26, three strip switches can be seen. These are the first floor mounted strip switch 90, a second strip 30 switch 116 carried on frame rail 80, and a third strip switch 118. These strip switches will stop the movement of the bridge or floor if they are tripped by contact with the aircraft, the stairs or the stair handrail of the aircraft. They are electrically wired to the control panel and will be wired to facilitate operation interruption of the floor or the bridge itself depending on which switch is contacted. 35 Returning to FIG. 4 for a moment. This figure somewhat pictorially shows how the frame on the underside of the cab is formed to provide an opening for commuter aircraft staircase handrails. Normally frame member 76 would extend past frame member 78 to the side edge frame section of the cab behind item 48. In a preferred embodiment, however, the frame member 76 is cut, at least in the instances where currently existing passenger boarding bridges are modified for use with commuter aircraft, at the flange 120 location. Cutting into the cab frame would not, of course, be necessary in the construction of new bridges incorporating this embodiment. Either a flange or other connection, such as a weldment connects frame items 76, 78, 80, and 81 to form the frame structure around the opening that will accommodate the handrails. A gusset 122 may be welded in place as shown to add structure to the frame used in this embodiment.

FIGS. 5, 6, 8, and 9 show the bumper articulation equipment. The static bumper 68 is fixedly attached to the cab frame. It is generally a hollow structure or a structure having an internal cavity that may contain a restraint element such as 124. The second and movable portion of the bumper 70 is attached to support element 126 in a sturdy fashion. The support element 126 is one leg of a related bellcrank structure which is pivotally mounted to the frame structure of the cab inside the fixed bumper portion while a second end or second leg of the bellcrank structure 128 of the support bracket 126 is pivotally connected to the outboard end of the bumper actuator 104. As stated earlier the bumper actuator is mounted through a gimbal 108 to the cab frame.

Actuation of the linear actuator, power and control is provided from the operator's console by conduit 110, will move the second end 128, which is a leg of a bellcrank structure, inboard (in FIG. 6) through slot 130 in the fixed bumper 68. The support element 126, upon retraction of the linear actuator 104 will end up below the lower surface of the fixed bumper such that the top of both the fixed 68 and movable 70 bumper portions are aligned as shown in FIG. 2.

FIG. 8 and 9 show the pivot point for the movable bumper. Support item 126 hosts the welded on structure 128, the second end 128 with the clevis elements to receive the pivotably mounted end of the linear actuator 104, not shown, and the pivot mounting and bellcrank leg 124. This bellcrank leg 124 is welded to the support element 126 on an angle relative to the support element 126 generally with the acute angle formed on the side of the bellcrank leg 124 is somewhat offset or twisted relative to the support element which shows as an edge 132 in FIG. 6.

Although not shown in the figures the pivot point for pivoting of the movable bumper is carried through the clevis mounting means 134 at the end of the pivot mounting bellcrank leg 124. This clevis mounting means 134 will attach in a well known way to a bored block (not shown) carried inside the stationary bumper. The block will be mounted to a structural element connected to the frame to which the bumper is also attached. This will be a pivot pin bolt type connection similar to the connection of the linear actuator to clevis means 136 on the second end 128 of the support element.

In servicing commuter aircraft the passenger boarding bridge will be used as follows.

With the airplane parked on the apron, the operator of the passenger boarding bridge will drive the cab toward the parked aircraft. Before getting to the aircraft the passenger boarding bridge will be elevated to the height necessary to service the commuter aircraft. This will generally be lower than is routine for servicing large jet aircraft passenger doors. The operator will also raise the movable section of the bumper and open the floor gap. The movable portion of the bumper 70 will be swung upwardly and inboard to the position shown in FIG. 3. The bumper operation is effected by the passenger boarding bridge operator actuating a switch at the operator's station to actuate the linear actuator 91. This actuator will operate through the bellcrank linkage associated between the gimbal mounted linear actuator and the movable section 70 of the bumper. The operator will open the floor section after the bumper has been raised. That is, from the operator's station an electric switch will be switched to actuate the linear actuator 91 to retract the movable, slidable floor panel by means of the linkage attached between the underside of the floor and the linear actuator. The floor will be caused to slide to the operator's left to a full open position. The handrail extension 72 will telescopically lengthen to provide a barricade extending from the handrail 66 to the right side barricade 60.

With a large floor opening or slot in the floor provided, the passenger boarding bridge operator can now drive the passenger boarding bridge up to the aircraft. In the meantime the onboard commuter aircraft crew will open the exit door and deploy the stowed steps associated with the door and used for entering and exiting the aircraft. These steps will, in many cases and as stated earlier, have a passenger handrail on the right side of the steps as viewed from outside the aircraft—that is, a passenger entering the aircraft will have the handrail on his or her right side and on his or her left side when they exit the aircraft.

With the aircraft steps and handrail deployed the passenger boarding bridge operator will drive the cab of the bridge toward the aircraft with the intent of directing the cab such that the aircraft's handrail fits into the floor opening or slot of the cab. The handrail of the aircraft will be located as far to the bridge operator's right—the right side of the opening as possible. The bridge cab will be driven as close to the aircraft as possible without serious contact. Finally, with the aircraft's handrail as far to the right as possible (within the range of average operator skill), the passenger boarding bridge operator will actuate an electrical switch at the operator's station to power the linear actuator that will slide the slidable floor toward the aircraft's stair handrail. The sliding floor includes a strip switch 90 on the edge approaching the aircraft's handrail that will empower the floor linear actuator if the sliding floor contacts anything before being properly positioned by the bridge operator. With the sliding floor 62 covering the access cavity in the floor of the cab, passengers and crew may now embark and disembark from the personnel access portal of the aircraft. The passengers will walk between the handrail 66 of the passenger boarding bridge and the upstanding movable portion of the bumper 70. The aircraft handrail will be redundant to the bridge handrail and will, in most cases, not have to be used.

When the servicing of the commuter aircraft is complete the bridge operator will cause the sliding floor to slide left to open the aircraft handrail zone. The bridge will then be backed away from the aircraft, the sliding floor cycled back to close the access void in the cab floor and the movable bumper portion will be cycled to its horizontal "home or first" position. The passenger boarding bridge is now ready to service a large size aircraft or, after repeating the steps above, to service another commuter aircraft with door/step assemblies.

The invention here can be characterized, in summary, as a dual purpose passenger boarding bridge capable of replicating the utility of a non-specialized passenger boarding bridge for servicing standard aircraft and also serving the special needs of commuter aircraft. This is a passenger boarding bridge of the type bridging the gap between a passenger terminal in an airport and a parked aircraft. A non-specialized passenger boarding bridge is normally incapable of servicing commuter aircraft which have self-contained deployable embarkation steps. This dual purpose passenger boarding bridge has the capability of accommodating commuter aircraft as well as standard aircraft. It includes a tunnel section with an inboard end proximate to the passenger terminal and a bubble section attached to the tunnel section and capable of moving therewith to the parked aircraft. A cab section is attached to the bubble section of the passenger boarding bridge, this cab section has a floor portion and is the portion of the passenger boarding bridge that will interface directly with the parked aircraft. A slot is created in the floor of the cab section so that a portion of the self-contained deployable embarkation steps, namely a hand rail associated with the embarkation steps, can be accepted by the slot as the passenger boarding bridge is positioned into an interface position with the aircraft.

The slot in the floor of the cab is formed by removing a section of the cab floor. The floor portion will be moved or slid under an adjoining floor section to create the slot in the preferred embodiment of the invention.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the spirit and scope of the invention.

What is claimed is:

1. A dual purpose passenger boarding bridge for bridging the gap between a passenger terminal in an airport capable of servicing both standard aircraft and commuter aircraft, which have self-contained deployable embarkation steps including an associated hand rail, said bridge comprising:

a tunnel section having an inboard end proximate to said passenger terminal;

a bubble section attached to said tunnel section and capable of moving therewith to said parked aircraft;

a cab section for interfacing directly with said parked aircraft attached to said bubble section and having a floor; and a portion of said floor being selectively removable to form a slot to prevent interference with said hand rail when servicing commuter aircraft.

2. In a passenger boarding bridge adaptable for use with small commuter aircraft of the type having self-contained, deployable stairs with a protruding handrail as an integral part thereof, said bridge having a cab with a fixed floor at its free end, the improvement comprising:

a fixed bumper attached to said cab adjacent said floor for engagement with said commuter aircraft;

a movable bumper normally oriented in a first position in alignment with said fixed bumper for engagement with aircraft larger than said commuter aircraft;

means for moving said movable bumper to a second position out of alignment with said fixed bumper; and a movable floor supported on said cab and movable between a support position in which it is substantially coextensive with said fixed floor for servicing larger aircraft and a clearance position to avoid contact with said protruding handrail when servicing commuter aircraft;

whereby said fixed bumper may be positioned immediately adjacent said commuter aircraft when said movable bumper is in said second position and said movable floor is in said clearance position.

3. The invention according to claim 2, and further comprising a railing mounted on said movable floor and normally abutting said cab when said movable floor is its support position, and a rail extension connected between said safety rail and the cab, said handrail and said extension serving to block access to the open slot formed by movement of the moveable floor to its clearance position.

4. The invention according to claim 2, and further comprising disabling means which are concealed when said moveable floor is in its support position and exposed when said moveable floor is in its clearance position, and when contacted by said protruding handrail are arranged to prevent further movement of the bridge and floor in the direction that initiated such contact.

* * * * *